(12) United States Patent
Hall et al.

(10) Patent No.: US 12,534,356 B2
(45) Date of Patent: Jan. 27, 2026

(54) METHOD AND MACHINE FOR DISPENSING AN INDIVIDUAL FORMULATION OF A BEVERAGE

(71) Applicant: BRAIN BREW VENTURES 3.0, INC., Newtown, OH (US)

(72) Inventors: Douglas B. Hall, Newtown, OH (US); Joe Girgash, Saint Paul, MN (US); Scott Dunkle, Cincinnati, OH (US)

(73) Assignee: Brain Brew Ventures 3.0, Inc., Newtown, OH (US)

( * ) Notice: Subject to any disclaimer, the term of this patent is extended or adjusted under 35 U.S.C. 154(b) by 579 days.

(21) Appl. No.: 17/890,705

(22) Filed: Aug. 18, 2022

(65) Prior Publication Data

US 2023/0029220 A1    Jan. 26, 2023

Related U.S. Application Data (63) Continuation of application No. PCT/US2021/018502, filed on Feb. 18, 2021.
(Continued)

(51) Int. Cl.
*B67D 1/08* (2006.01)
*B67D 1/00* (2006.01)

(52) U.S. Cl.
CPC ......... *B67D 1/0884* (2013.01); *B67D 1/0034* (2013.01); *B67D 1/0888* (2013.01);
(Continued)

(58) Field of Classification Search
CPC ... B67D 1/0022; B67D 1/0034; B67D 1/0041
See application file for complete search history.

(56) References Cited

U.S. PATENT DOCUMENTS 11,192,772 B1 * 12/2021 DeRaedt ............. G05B 19/042
2006/0213854 A1    9/2006 Singh et al.
(Continued)

FOREIGN PATENT DOCUMENTS

| EP | 1637055 A2 | 3/2006 |
|---|---|---|
| GB | 2 178 003 A | 2/1987 |
| WO | WO 99/16699 A2 | 4/1999 |

OTHER PUBLICATIONS

European Search Report for EP 21756496.2 dated Feb. 7, 2024, 14 pages.
(Continued)

*Primary Examiner* — Michele L Jacobson
(74) *Attorney, Agent, or Firm* — FBT Gibbons LLP (57) ABSTRACT

The present invention is a method for developing and providing a personalized distilled spirit, or other beverage, to a user who responds to a collection of stimulus in the form of taste samples, smell samples, written, and/or visual representations. The user's responses to the stimulus may be compared to expert responses in a database to create a recommended recipe resulting in one or more customized product samples being either physical products or written/visual responses in the form of tasting notes or a flavor map, for example. The user can then modify their customized spirit, repeating the process as many times as they wish and then submit for the production and purchase of the recipe based on an array of spirits or other beverages that is then combined using a blending machine.

14 Claims, 4 Drawing Sheets

Related U.S. Application Data (60) Provisional application No. 63/236,024, filed on Aug. 23, 2021, provisional application No. 62/977,748, filed on Feb. 18, 2020.

(52) U.S. Cl.
CPC ............ *B67D 2210/00086* (2013.01); *B67D 2210/00123* (2013.01)

(56) References Cited

U.S. PATENT DOCUMENTS

| | | | |
|---|---|---|---|
| 2011/0022225 A1* | 1/2011 | Rothschild | G07F 13/06 700/233 |
| 2012/0223096 A1 | 9/2012 | Rudick | |
| 2014/0069953 A1 | 3/2014 | Metropulos et al. | |
| 2014/0335242 A1 | 11/2014 | Huang | |
| 2015/0257586 A1 | 9/2015 | DiNucci et al. | |
| 2016/0090288 A1* | 3/2016 | Givens, Jr. | G07F 13/065 700/283 |
| 2016/0368753 A1 | 12/2016 | Bethuy et al. | |
| 2018/0305649 A1 | 10/2018 | Hall et al. | |
| 2018/0362321 A1 | 12/2018 | Lim et al. | |
| 2020/0270553 A1* | 8/2020 | Hall | C12G 3/07 |

OTHER PUBLICATIONS

International Search Report Written Opinion for PCT/US21/18502 filed Feb. 18, 2021, 12 pages.

\* cited by examiner

METHOD AND MACHINE FOR DISPENSING AN INDIVIDUAL FORMULATION OF A BEVERAGE

CROSS-REFERENCE TO RELATED APPLICATION

The present application is a continuation of International PCT Patent App. No. PCT/US2021/018502 filed Feb. 18, 2021, and entitled "System and Process for Dispensing an Individual Formulation of a Distilled Spirit" which claims the priority benefit of U.S. Provisional Pat. App. 62/977,748, filed Feb. 18, 2020, and entitled "System and Process for Dispensing an Individual Formulation of a Distilled Spirit;" the present application further claims the priority benefit of U.S. Provisional Pat. App. No. 63/236,024 filed Aug. 23, 2021, and entitled "Method and Machine for Dispensing an Individual Formulation of a Beverage," the disclosures of which are incorporated by reference herein in their entireties.

BACKGROUND OF THE INVENTION

1. Field of the Invention

The present invention relates generally to development of a beverage for consumption. More particularly, the invention relates to a unique beverage, preferably a distilled spirit, and the method of making such beverage or distilled spirit based on personal preferences of an individual.

2. Description of the Related Art

In traditional whiskey-making methods, a high proof distillate is aged in an oak barrel such that the wood adds color and flavor to the whiskey. The time it takes to age a particular spirit can be anywhere from 3 to 50 or more years. Generally speaking, the longer aged spirits are able to interact more with the wood of the barrels and develop a more refined flavor, taste, color, finish, and smoothness as desired by consumers and collectors. The greater interaction with the wood barrel is based on just the time the aging liquor has in contact with the wood of the barrel.

However, individuals have different preferences on what is most desired for themselves as they enjoy a distilled spirit. For example, some individuals may like a sweeter finish, while others may like a distilled spirit to have a larger mouth feel.

Typically, because of personal preferences this has meant that an individual must purchase different bottles of their preferred type of distilled spirit to find one of the "standard" commercially available distilled spirits that meets most of their individual distilled spirit preferences. The ability to find or make one's own distilled spirit that meets all the preferences and criteria desired by an individual has not been available because of the long aging time of the traditional methods of making distilled spirits as well as the industry's inability to economically and practically create potentially thousands to millions of individualized distilled spirits.

What is desired is a method to personalize or individualize flavor, taste, color, finish, and smoothness of a spirit that has the traditional multiple years of aging with a wood barrel; however, at a significantly shorter period of time, and thereby also creating of new flavors never before thought possible.

SUMMARY

The present invention is a method for developing and providing a personalized beverage, in particular as a distilled spirit, to a user based upon user input to stimuli and then mixed and dispensed by a blending machine to match the user's desired beverage characteristics.

In various exemplary embodiments, the present invention is a method for developing and providing a personalized distilled spirit to a user that involves consumer responses to sensory, visual or literary stimulus, comparison of consumer responses to an expert database of responses to craft a suggested recipe, presentation of a physical, literary or visual product sample to consumers, consumer acceptance or adjustment of custom recipe and the option for additional cycles of optimization leading eventually to submission of recipe for the creation of a customized spirit using a blending machine.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

In reference to the drawings, similar reference characters denote similar elements throughout all the drawings. The following is a list of the reference characters and associated element:

301-306 beverages
400 blending machine
410 container
415 input tube
425 pump
435 user interface
445 CPU or microprocessor
450 dispenser
480 bottle

DETAILED DESCRIPTION

Exemplary embodiments of the present invention include a method of developing a personalized beverage, and in a preferred embodiment, a personalized distilled spirit, wine, cocktail, or a combination thereof.

The terms "distilled spirit" or "spirit," used throughout, refers to a distilled beverage that has at least 10% alcohol by volume (ABV). And it is preferred that the alcohol by volume not exceed bout 75%. The spirit herein can be a raw or aged spirit, where an aged spirit needs to be in wood for at least three years according to some countries' regulations.

The spirit may be any of whiskey, scotch whisky, bourbon, vodka, gin, rum, brandy, eau de vie (fruit brandy or schnapps), tequila, baijiu, soju, aguardiente, pálinka, cachaça, singani, borovička, slivovitz, or a combination thereof.

Figure 1:
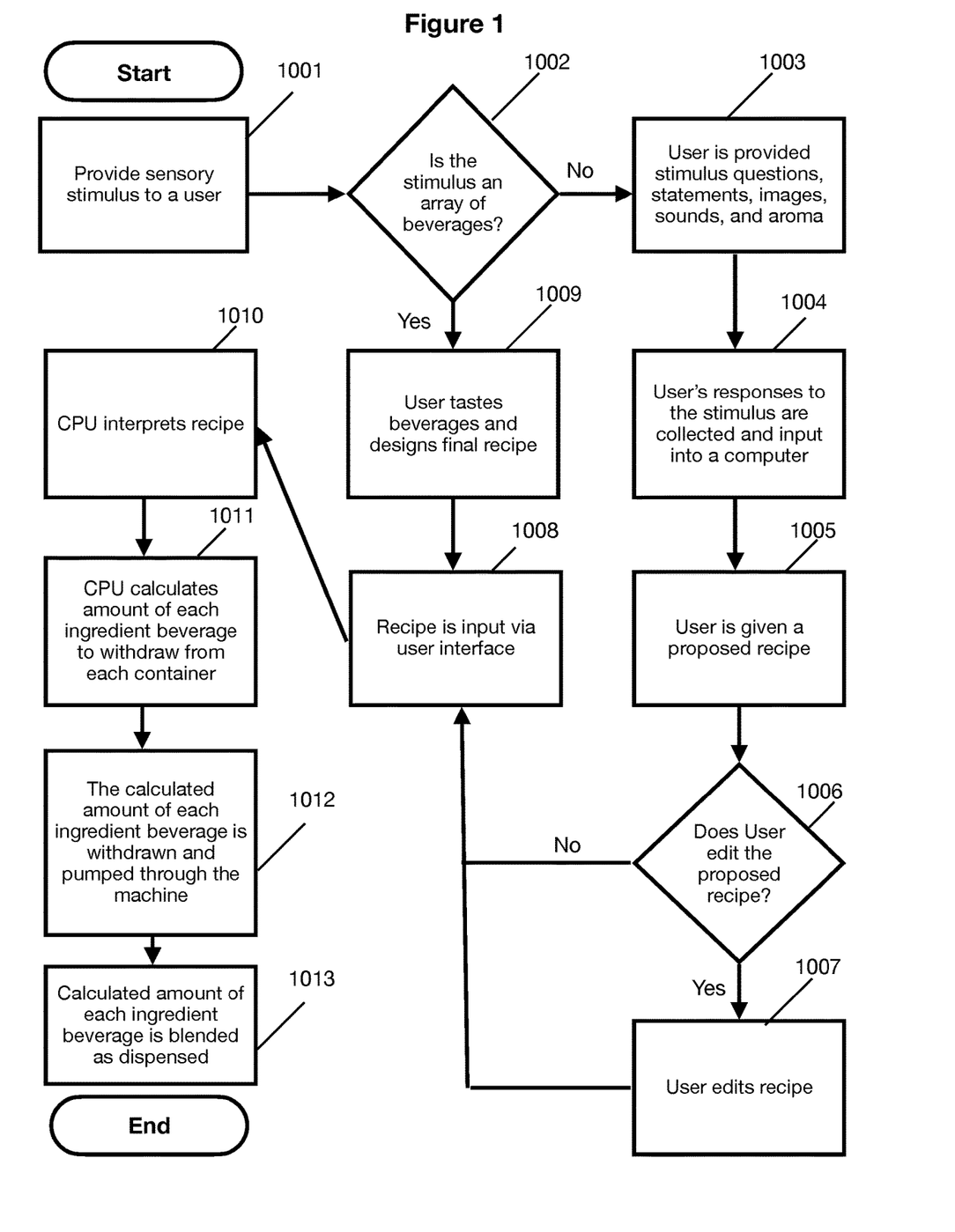
FIG. 1 illustrates an example of a method of developing and inputting information into a blending machine to recreate and dispense an individualized beverage.

In various exemplary embodiments, the present method begins by presenting sensory stimulus to a user. Block 1001. In exemplary embodiments, the sensory stimulus is in the form of an array of beverages, as, in exemplary embodiments, distilled spirits, wine, cocktail ingredients or a combination thereof. Block 1002.

Each of the spirits, where distilled spirits are the beverage, used in the present invention are preferably made using the method set forth in international PCT Application No. PCT/US2016/057297, incorporated fully by reference.

Figure 3:
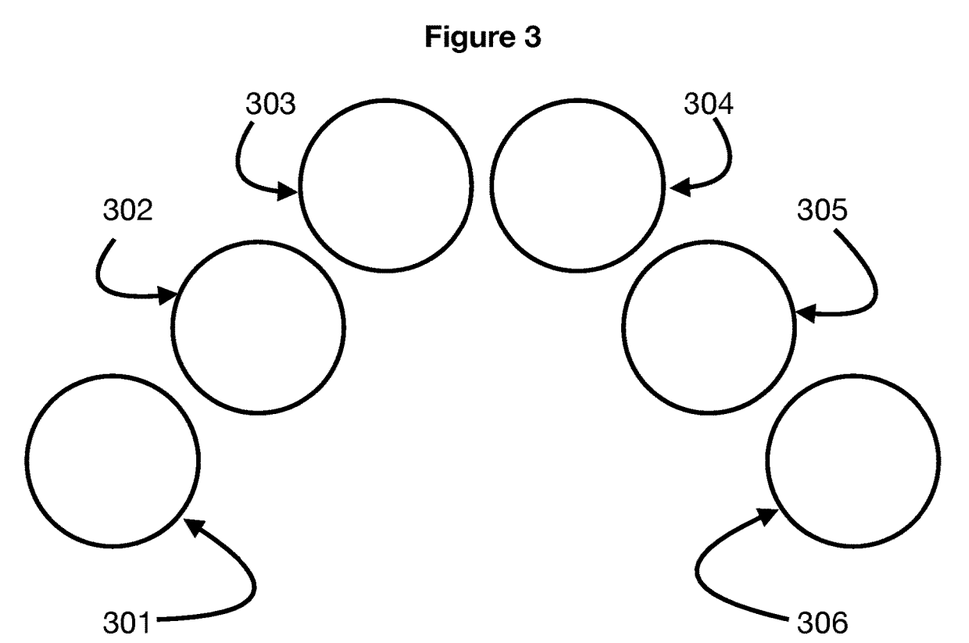
FIG. 3 illustrates an example of an array of spirits presented to a user.

In the array, as exemplified in FIG. 3 when the beverage is a spirit, the variables are selected from one or more of: the type of wood used to make the spirit, the age of the wood to make the spirit, the preparation of the wood used to make the spirit, pressure used to make the spirit, cycles of pressure on the spirit and wood, and the alcohol percentage used. In embodiments where the beverage is a wine, there may be variables such as variety, age, finish, etc.

The user is then encouraged to sample each of the beverages, 301-306, and make notes for oneself about characteristics about the sampled spirit for later reference. The characteristics can range from color, taste, mouth feel, smoothness, aftertaste, smokiness, etc.

Although encouraged to do so, users are not required to sample every sample of beverage in the array.

Once the user feels ready to do so, the user is encouraged to mix portions of the different beverages of the array, where the mixing of portions is conducted in a separate container.

When mixing, the user may be encouraged to reference the notes taken while the user sampled the beverage individually in order to develop an individualized beverage with the characteristics most desired by that user, and thereby creating a customized beverage. The user may continue to make as many mixtures as needed until the user determines that a final mixture, or multiple mixtures, meeting the user's personal criteria are met. As a number of possible final mixtures in immense, it is possible that every user ends up developing their own unique formula, i.e., recipe, for a spirit.

The mixing may be done using pipets, shot glasses, graduated cylinders, and the like. It is important, however, that the user make note of the amount of each sample mixed into the final mixture created by the user. Block 1009. The amount of each sample in the final mixture will be used to determine the ratio of each beverage needed to create the user's personalized beverage in whatever size volume desired by the user.

Once the user obtains a recipe that the user would like to save or use to scale up, the user may manually write down the recipe or input the recipe into a standard computer, Internet-connected phone or tablet, Block 1008, that will use proprietary software to provide a link or code to obtain the data on the user's respective recipe. The recipe may be saved in the computer storage or remotely where the computer to which the recipe is input is connected to the Internet.

In exemplary embodiments, the recipe of the user is compared to stored recipes of experts, i.e., those that are known to have more than ordinary skill in their respective art/industry, to give a second proposed recipe. The user may use or alter either or both of proposed recipes.

In other embodiments of the present invention, rather than provided with an array of beverages to sample in person, a user may be provided with multiple forms of stimulus to evoke a response. Block 1003.

The multiple forms of stimulus may be in the form of one or more questions, statements, images, existing brand representations, sounds, and aromas. Once provided with a piece of stimulus, the user is encouraged to react to it. The reaction may be in the form of answering an open-ended question, choosing between provided binary responses, providing a Likert scale response, choosing from predetermined multiple-choice responses, giving a ranking to provided options, using a numeric or slider scale response, image or aroma choice preference, samples of physical products, tasting notes, flavor maps, or a combination thereof.

For example, a user may be given a series of questions asking, for example, "Would you like your custom whiskey to . . . " with three populated responses, "(1) Have a more CLEAN taste, (2) Have a more COMPLEX taste, or (3) Have a more CLEAN and COMPLEX taste." Other questions, could relate to, for example, the desired sweetness, aftertaste, whether the user tends to drink, for example, a distilled spirit neat, on ice, or as a mixed drink.

In exemplary embodiments, the user may be presented with a decision tree format where, as an example, the user may be asked if smokiness is a desired attribute of the beverage that the user would like. If yes, then the user may be presented with options of beverages with smokey attributes. If no, then the user may be presented with options of beverages without smokey attributes. Where the user states yes for desiring smokiness, levels of smokiness may be presented as different options for the user. And where the user said no smokiness attributes are desired, different options of beverages with rich complexity or big and bold flavor profile, all without smokiness, may be presented. Such decision tree formats may be presented to the user to encompass any number of characteristics or attributes that may be asked relative to a beverage or in general like/dislike by the user. No matter the number of decision tree formats offered, a user is directed towards a beverage that more likely will match their tastes, mouthfeel, etc.

Similar to the decision tree format, users may be provided with beverage options listed by categories that are predetermined. Such predetermined categories could be, for example, sipping bourbons, artisan bourbons, and ming bourbons. In this example the bourbons are categorized based on use or how they would be consumed. However, other categories can be developed based on the beverage type.

In other embodiment, a series of images may be presented to a user showing, for example, four seasons of nature and asking for the user to identify the user's favorite image/season. The images could be in the form of different foods such as barbecue being pulled from a smoker, a hamburger, fillet of salmon, etc., and again asking the user to identify a favorite image. The same could be done with images of foods with various and generally agreed upon levels of sweetness. It may also be in the form of presenting tasting wheels, other flavor visualizations, or through sharing written tasting notes.

Once a user has responded to the predetermined stimulus for which a response is required, the responses are input into a computer, Block 1004, where they are compared and contrasted to the characteristics of predetermined ingredients that are then combined in various amounts, virtually, resulting in a proposed recipe for the user. Block 1005.

The proposed recipe is then provided to the user. In a preferred embodiment, the user may optionally then alter the amount of each of the predetermined ingredients if desired. Blocks 1006 and 1007.

In exemplary embodiments, the responses of the user are compared to stored responses of experts, i.e., those that are known to have more than ordinary skill in their respective art/industry, to give a second proposed recipe. The user may use or alter either or both of proposed recipes.

It is preferred that the number of pieces of stimulus that each user responds to be between 5 and 20, and more preferably, between 8 and 15.

Whether the user develops a recipe by tasting an array of beverages or by responding to multiple pieces of stimulus, the final recipe of the user is then captured in hard copy or digitally. When digital, the user may be provided a link or code to obtain the data on the user's respective recipe.

Figure 4:
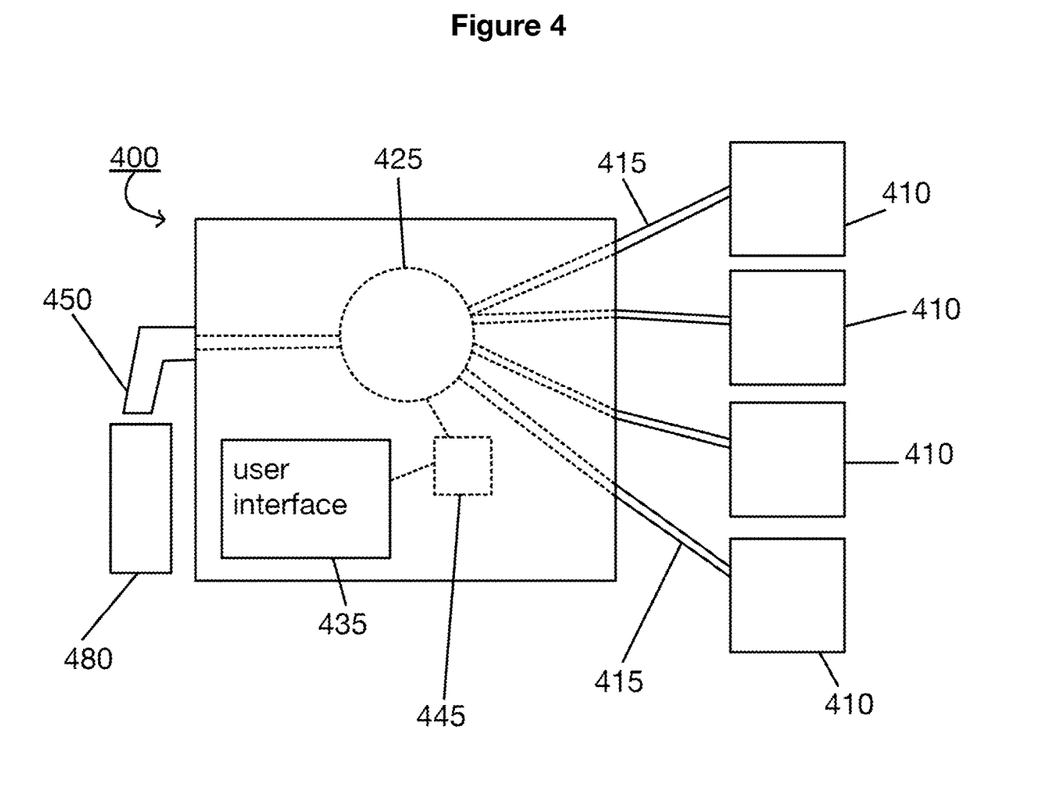
FIG. 4 illustrates an example of a blending machine according to exemplary embodiments of the present invention.

The recipe of the user's final mixture is then input into a blending machine 400 via a user interface 435. The user interface may be in the form of a graphical and/or textual interface where, when present, a graphic may be associated with each of the ingredient beverages or spirits, where "ingredient beverage" or "ingredient spirit" is used to denote one of the beverages connected to the blending machine and from which it can pull. The user interface may include use of a keyboard, computer mouse, touch screen, scanner, or a combination thereof.

Where manually inputting the recipe, the amount of each ingredient beverage is input via the user interface. Block 1008.

In exemplary embodiments, a user may send a recipe via the Internet, Bluetooth, or similar communication methods, to blending machine or a computer connected to the blending machine.

In an exemplary embodiment, a user may be provided with a Quick Response (QR) code or similar matrix barcode that is a machine-readable optical label that contains the data associated with the user's final recipe. The QR code may be read where the user interface includes a scanner capable of reading QR codes and is preferably connected to the Internet, have Bluetooth connect-ability, or a combination thereof.

Figure 2:
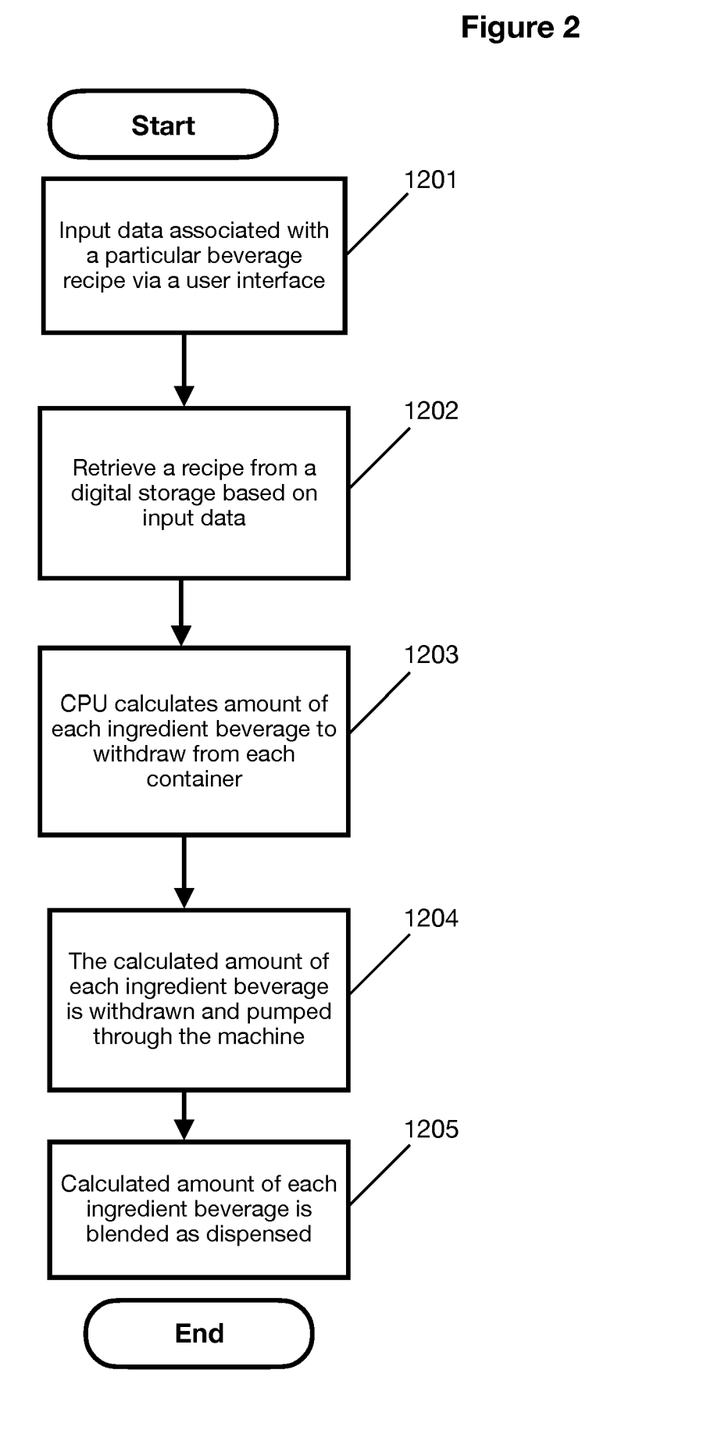
FIG. 2 illustrates an example of a method of inputting information to recall a recipe from digital storage that a blending machine then uses to recreate and dispense an individualized beverage.

The user interface is connected to a central processing unit (CPU) or microprocessor 445 of the blending machine which then interprets the data of the recipe, Block 1010, and then calculates the amount of each ingredient beverage to mix for a given overall volume to ultimately dispense. Blocks 1011 and 1203. These calculations may then be converted into electronic pulses that drive stepper motors (not shown) connected to the pumps 425.

The blending machine is connected to multiple containers 410 that retain each respective ingredient beverage. The multiple containers may be in the form of bottles, carboys, bags, and other suitable beverage holding devices. The actual container may vary based on the type of beverage. For example, a bag may be better for use with a wine or other beverage that can oxidize, and the bag may significantly reduce the possibility and effects of oxygen. The multiple containers may be hidden from view or visibly displayed. In exemplary embodiments, the containers are bottles that are lit from underneath. The connection is preferably through at least a food-grade individual input tube 415 and a pump 425 that can precisely withdraw a volume of the respective ingredient beverage from its respective container and transfer it through the blending machine, Blocks 1012 and 1204, and through a dispenser 450 and into a user's bottle 480, cup, or other sort of container. Blocks 1013 and 1205. The CPU directs the connected pumps on the amount of each ingredient beverage based on the user's recipe.

For example, in an example where a user samples six different whiskeys each made with a different type of wood, a user may create a recipe using 25% of the second whiskey, 50% of the third whiskey, 20% of the fifth whiskey, and 5% of the sixth whiskey. The values are input into a blending machine having an input from each of the six whiskeys sampled by the users. The blending machine then pulls in the appropriate amount of each whiskey chosen by the user for his/her own recipe to make any volume ranging from an ounce to a bottle.

In exemplary embodiments, the machine may dispense a small amount, an ounce, for example, of the recipe of the user. The user may then taste, smell, visually observe the actual beverage created with the recipe of the user; allowing the user to then alter the recipe or dispense a larger volume of the beverage.

One or more bottles of the user's recipe are then made based on the amount of each ingredient beverage wanted by the user. The user's unique recipe may also be retained in a digital storage, which may be directly or indirectly connected to the microprocessor. In exemplary embodiments, the user interface allows a user to access previous recipes, Block 1201, that are retrieved from digital storage based on user input. Block 1202. And those stored recipes may be used indefinitely for the user to make future bottles if desired.

Recipes may also be presented to a bartender or other person who is monitoring or running the blending machine. The recipes may be provided digitally on a screen or printed out in hard copy. The bartender or other person is then able to readily provide feedback to the user regarding the same user's recipe, where such feedback may be advice such as a cocktail using the beverage created via the recipe, how it would be best consumed, and food that may pair well with it.

In exemplary embodiments, a label may also be prepared for the user's container. In addition to any relative legal and regulatory label requirements based on contents and geographic location, a user may personalize the label with text, images, or a combination thereof.

In other exemplary embodiments, custom tasting notes may be provided to the user based on the user's recipe. The tasting notes may be provided in hard copy, e.g., on the label, digitally via the Internet, or a combination thereof. The tasting notes are produced based upon the amounts of each ingredient beverage of the recipe as well as the interaction of particular ingredient beverages when mixed together in particular ratios.

Cocktail recommendations may also be provided to a user based upon the user's recipe. Like the tasting notes, the cocktail recommendations may be based upon the amounts of each ingredient beverage of the recipe as well as the interaction of particular ingredient beverages when mixed together in particular ratios.

It should be noted that although the term, beverages, is used throughout, the present blending machine can be connected to containers holding any of liquids, gels, or liquid-like substances.

In an exemplary embodiment, the blending machine has most of the ingredient beverages connect from the individual input tubes into a single tube, after being calculated and measured based on how much should be pulled from each component container, and then output into a vessel, container, or bottle at the output dispenser of the blending machine.

In order to reduce or eliminate contamination, the blending machine may include a tube within a tube design. Such tube within a tube design is particularly beneficial when at least one of the ingredient beverages that could be drawn through the blending machine is especially strong in flavor, color, or aroma such that it would leave a contaminant in the form of residual flavor, color, or aroma if mixed with the other ingredient beverages prior to introduction to a vessel, container, or bottle after passing through the blending machine.

For example using the above distilled spirits example, if one of the distilled spirits has a smokey flavor, combining the smokey flavored spirit with the non-smokey flavored spirits prior to leaving the blending machine could leave a contaminated/residual smokey flavoring within the tubing of the blending machine that would not be desired for the next user's recipe, and thereby, taint the subsequent blending.

In such circumstances of the tube within a tube design, an inner tube is substantially surrounded by a larger tube such that any ingredient beverages that are pumped through the outer tube are pumped in the space between an inner wall of the outer tube and the outer wall of the inner tube. Meanwhile, ingredient beverages that are pumped through the inner tube are pumped between the inner walls of the inner tube. In such design, multiple independent tubes may be encapsulated by a larger tube in order to separate out each ingredient until it is dispensed.

The ingredient beverage that has a potentially strong color, aroma, or flavor that is to be kept separate may be pumped through either the inner tube or the outer tube. Preferably, such component ingredient is not combined with the other ingredient beverages until the leaving the tubing of the blending machine to be dispensed into another container or bottle. It is preferred to not funnel the inner tube and outer tube into a funnel prior to being introduced to a container or bottle because then the funnel would also then be contaminated with the component ingredient having the stronger flavor, aroma, or color.

Although the ingredient beverage having the strong flavor, aroma, or color is kept separate from the other components ingredients until being dispensed from the tubing of the blending machine, the other components may be mixed into either the inner tubing or outer tubing together prior to being dispensed into the subsequent container or bottle.

The flow diagrams depicted herein are just examples. There may be many variations to these diagrams or the steps (or operations) described herein without departing from the spirit of the invention. For instance, the steps may be performed in a differing order, or steps may be added, deleted, or modified. All of these variations are considered a part of the claimed invention.

It should be pointed out that the blending machine solves an issue faced by many bars, restaurants, and other facilities that have a center area for prepared beverages for others, especially at high volume gatherings. Using a scanner to read, for example, as QR code for a consumer, a bartender can more quickly create the consumer's beverage choice, without having to open up several bottles or ingredients. The bartender in an exemplary method, then approves the dispensing of the beverage. The approval may be in the form of a button that then starts the dispensing. The blending machine can be set to have a default drink size, which can be altered by the bartender, either temporarily or indefinitely, if needed.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for developing and dispensing a personalized beverage; the method being comprised of the steps of:
   providing a user with multiple sensory stimuli including providing the user with an array of distilled spirits for the user to sample;
   collecting the user's one or more responses arising from the stimuli;
   inputting the user's responses via a user interface of a beverage blending machine, wherein the beverage blending machine is comprised of the user interface, a microprocessor connected to the user interface, multiple containers that retain individual ingredient beverages, an input tube in each respective container, one or more pumps connected to each input tube, and a dispensing tube, wherein the dispensing tube is comprised of an inner tube substantially surrounded by a larger tube such that any ingredient beverages that are pumped through the outer tube are pumped in the space between an inner wall of the outer tube and the outer wall of the inner tube and ingredient beverages that are pumped through the inner tube are pumped between the inner walls of the inner tube;
   interpreting the user's responses using the microprocessor;
   calculating the amount of each ingredient beverage to provide for a given overall volume to dispense using the microprocessor;
   drawing the calculated amount of each ingredient beverage using the one or more pumps connected to the respective input tubes;
   dispensing the calculated amount of each ingredient beverage at the dispensing tube.

2. The method according to claim 1, wherein variables of the array of distilled spirits are selected from one or more of: the type of wood used to make the spirit, the age of the wood to make the spirit, the preparation of the wood used to make the spirit, pressure used to make the spirit, cycles of pressure on the spirit and wood, and the alcohol percentage used.

3. The method according to claim 1, wherein the user makes a personalized recipe by mixing from the array of distilled spirits and the personalized recipe is the user's response to the stimuli.

4. The method according to claim 3, further comprising comparing the personalized recipe to stored recipes, and presenting one or more stored recipes to the user before the step of calculating the amount of each ingredient beverage to provide for a given overall volume to dispense using the microprocessor.

5. The method according to claim 4, further comprising the user altering the personalized recipe, one or more stored recipes, or a combination thereof before the step of calculating the amount of each ingredient beverage to provide for a given overall volume to dispense using the microprocessor.

6. The method according to claim 1, wherein providing the user with the multiple sensory stimuli further includes one or more questions, statements, images, sounds, aromas, or combination thereof.

7. The method according to claim 6, wherein the step of collecting the user's one or more responses arising from the stimuli further comprises comparing and contrasting the user's responses to characteristics of predetermined ingredients that are then combined in various amounts, virtually, resulting in a proposed recipe for the user.

8. The method according to claim 7, wherein the proposed recipe is then provided to the user.

9. The method according to claim 7, further comprising comparing the proposed recipe to stored recipes, and presenting one or more stored recipes to the user before the step of calculating the amount of each ingredient beverage to provide for a given overall volume to dispense using the microprocessor.

10. The method according to claim 9, further comprising the user altering the proposed recipe, one or more stored recipes, or a combination thereof before the step of calculating the amount of each ingredient beverage to provide for a given overall volume to dispense using the microprocessor.

11. The method according to claim 1, wherein the user interface is a graphical interface where a graphic is associated with each of the ingredient beverages, and wherein the user interface may include a keyboard, computer mouse, touch screen, scanner, or a combination thereof.

12. The method according to claim 1, wherein the user's response to the stimulus is provided as a QR code and the user interface is a QR code scanner.

13. The method according to claim 3, further comprising providing custom tasting notes based upon the amounts of each ingredient beverage of the personalized recipe as well as the interaction of particular ingredient beverages when mixed together in particular ratios.

14. The method according to claim 3, further comprising providing cocktail recommendations based upon the amounts of each ingredient beverage of the personalized recipe as well as the interaction of particular ingredient beverages when mixed together in particular ratios.

* * * * *